United States Patent

[11] 3,626,147

[72] Inventor Sadao Sato
 Tokyo, Japan
[21] Appl. No. 871,002
[22] Filed Sept. 10, 1969
[45] Patented Dec. 7, 1971
[73] Assignee Kakumaru Industry Company Limited
 Tokyo, Japan
[32] Priorities June 30, 1967
[33] Japan
[31] 42/55823;
 June 14, 1967, Japan, No. 42/37530

[54] UNDERWATER ARC WELDING APPARATUS WITH PIVOTAL BASE
 6 Claims, 11 Drawing Figs.

[52] U.S. Cl. .................................................. 219/136,
 219/74, 219/130
[51] Int. Cl. ...................................................... B23k 9/00
[50] Field of Search .......................................... 214/68, 70,
 130, 145, 74

[56] References Cited
 UNITED STATES PATENTS

| | | | |
|---|---|---|---|
| 3,458,681 | 7/1969 | Wilson | 219/74 |
| 2,371,945 | 3/1945 | Barbeck | 219/70 |
| 2,422,811 | 6/1947 | Tyrner | 219/130 |
| 2,481,163 | 9/1949 | Setzler | 219/130 |
| 3,019,330 | 1/1962 | Guida | 219/119 X |
| 3,445,623 | 5/1969 | Fukushima | 219/130 |

OTHER REFERENCES
 The Welding Encyclopedia, Eleventh Edition 1943, pages 726–728

Primary Examiner—J. V. Truhe
Assistant Examiner—George A. Montanye
Attorney—Otto John Munz ABSTRACT: An underwater arc welding apparatus in which a composite consumable welding electrode, which transmits gas to the arc zone, is mounted in a support mechanism for pivotal movement and automatic underwater welding.

PATENTED DEC 7 1971 3,626,147
SHEET 1 OF 3
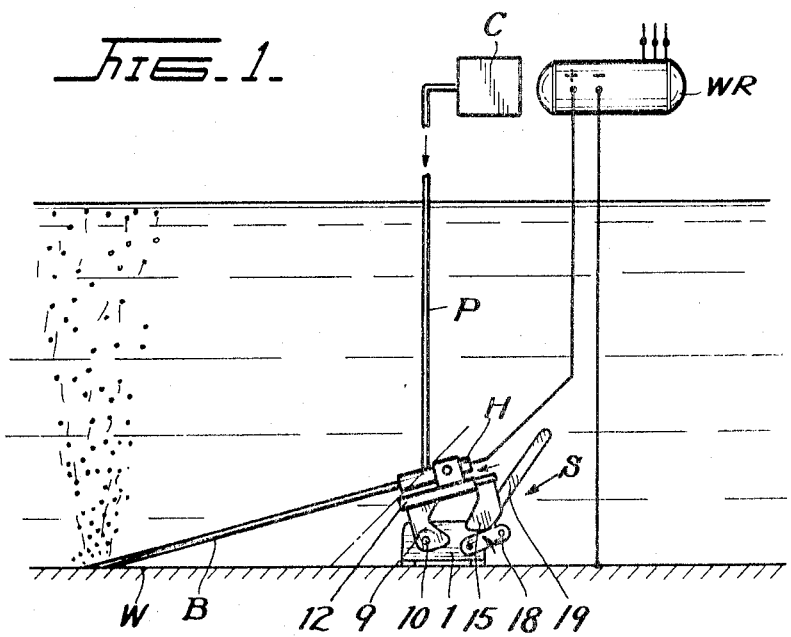
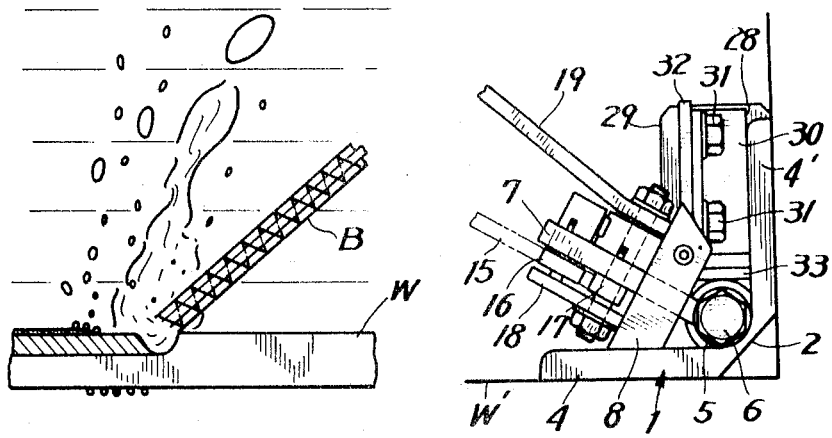
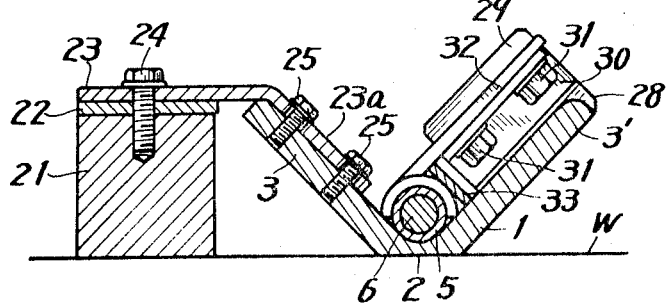
INVENTOR.
SADAO SATO
BY
ATTORNEY

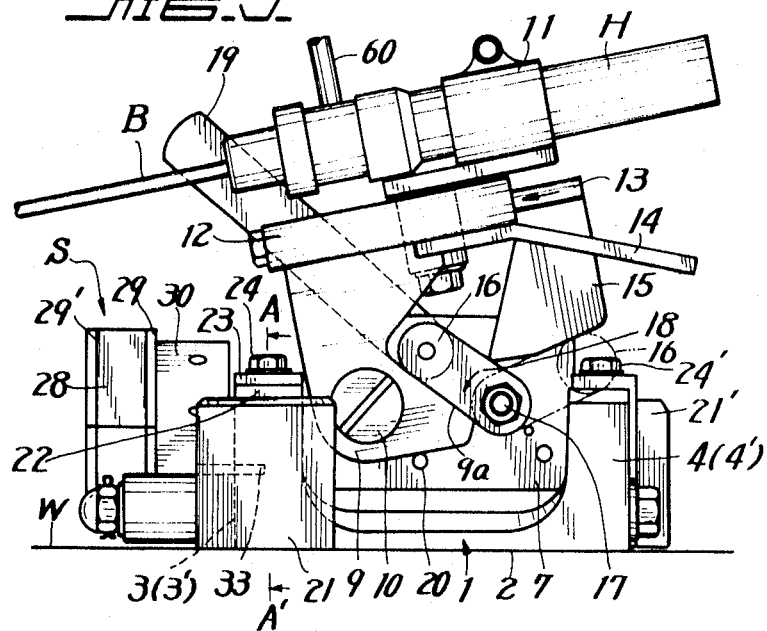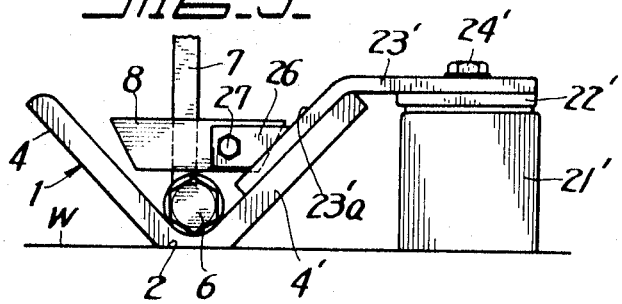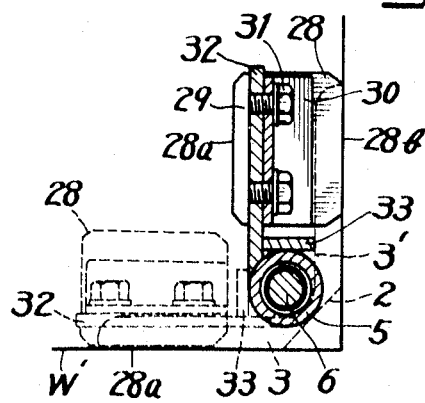

UNDERWATER ARC WELDING APPARATUS WITH PIVOTAL BASE

This is a division of application Ser. No. 698,778, now U.S. Pat. No. 3,521,022 filed Jan. 18, 1968.

BACKGROUND OF THE INVENTION

When portions below the water line of hulls of vessels which have sustained damages after being launched, and when the underwater portions of piers are welded, such welding operations in many cases have to be performed by the so-called underwater arc welding process. However, the underwater arc welding process has not been previously widely practiced because of various difficulties which may be encountered in carrying out the process. In order to successfully perform the underwater arc welding process, compressed gas has to be continuously sent to a welding zone on a workpiece to be welded so that the welding zone may be prevented from being directly contacted by the surrounding water. However, flames generated from the use of compressed gas in carrying out the underwater arc welding may be unstable and although the flames generated from compressed gas may be successfully employed for gas cutting of articles, the gas-generated flames can not be suitably employed for welding purposes. And in the so-called electric welding process in which a consumable welding rod is held rod is held in a holder, as the welding rod consumed the gas discharge port has to be accordingly retracted from a welding zone where arc is being struck out. In addition, the underwater arc welding process must be performed with scrupulous care so that the apparatus employed may be stabilized against the moving current of water.

SUMMARY OF THE INVENTION

A principal object of the present invention is to provide an underwater welding process in which as a consumable welding rod consumed compressed gas discharge port can be accordingly positioned to a desired relation with respect to the welding zone where arc is being struck out whereby compressed gas may at all times surround the welding zone and can maintain a stabilized arc in and around the welding zone.

Another object of the present invention is to stabilize a welding apparatus and associated devices against the influence of the moving current of water whereby the apparatus and devices can be properly positioned relative to a workpiece for successfully carrying out the welding process.

A further object of the present invention is to provide a gas passage, through which compressed air from a compressed air supply source may be guided to a welding zone, in a quite simple manner.

According to the present invention, a composite consumable welding rod is provided with an annular passage for compressed gas therein and as the consumable welding rod is gradually consumed a discharge port of the gas passage is retracted accordingly whereby compressed gas is discharged through the discharge port in such a manner that the gas can at all times surround a welding zone where an arc is being struck out. The annular passage for compressed gas is provided by disposing a hollow cylindrical outer sheath around a coated consumable welding rod in a peripherally spaced relation to the later; and the outer sheath is formed of the material which can melt due to the heat of arc, but does not burn up by such a heat. The outer sheath consumes in proportion to the consuming rate of the coated welding rod and acts to at all times position the discharge port of the annular gas passage adjacent to the operative tip end of the coated welding rod.

The above and other objects and advantages of the present invention will be more readily apparent to those killed in the art from the following description when read in connection with the accompanying drawings.

BRIEF DESCRIPTION OF THE THE DRAWINGS

FIG. 1 is a schematic view of an application of the underwater arc welding process according to the present invention illustrating the manner in which a workpiece disposed in the water is automatically welded;

FIG. 2 is a fragmentary side elevational view on an enlarged scale of portion of FIG. 1 especially showing a welding zone on said workpiece;

FIG. 3 is a side elevational view illustrating a first way for using a support mechanism for a welding rod holder;

FIG. 4 is a cross-sectional view taken substantially along the line A-A' of FIG. 3 and as seen in the arrow direction therein especially illustrating the pedestal of said support mechanism;

FIG. 5 is an end elevational view of said pedestal of the support mechanism as seen from the right hand of FIG. 3;

FIG. 6 is a rear elevational view illustrating a second way for using said support mechanism as shown in FIG. 3;

FIG. 7 is a vertically sectional view especially illustrating a support portion for a permanent magnet shown in FIG. 6 with portions not directly related to the supporting of the permanent magnet eliminated therefrom;

EMBODIMENTS OF THE INVENTION

Figure 8:
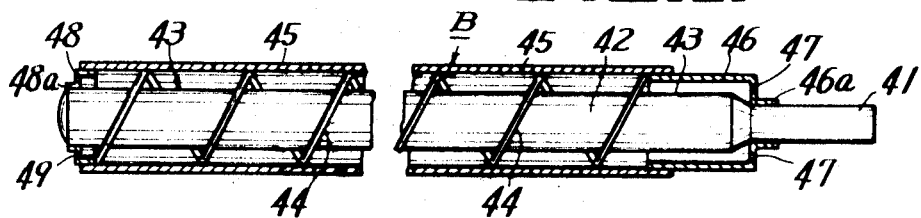
FIG. 8 is a longitudinally sectional view of a composite welding rod useful in carrying out the underwater arc welding process according to the present invention.

The present invention will be now described referring to the accompanying drawings.

As shown in FIG. 1, the underwater arc welding process according to the present invention is basically carried out by disposing a welder WR and a compressed air supply source C on shore or a craft as shown in FIG. 1, bringing a composite welding rod B held in a holder H to a workpiece W disposed in the water; supplying compressed air from the compressed air supply source C through a pipe P which connects between the supply source and holder and the holder H into the composite welding rod B at one end thereof so that the compressed air may pass through a through air passage defined within the welding rod and discharge at the other or tip end of the welding rod; and establishing an arc in an atmosphere consisting of such discharging compressed air by supply welding current from the welder WR through the holder H to the welding rod unit B as shown in FIG. 2. In this case, the tip end of the composite welding rod B may be manually brought to the welding zone on the workpiece W by gripping and manipulating the holder H or alternatively, also as shown in FIG. 1, the holder H is maneuverably supported on a support mechanism S fixedly secured to the top of the workpiece W and the composite welding rod B supported in the holder H is continuously urged toward the welding zone on the workpiece W so that the fore or tip end of the welding rod B may be at all times maintained in contact with the surface of the workpiece W at an angle thereto while varying the angle of the tip end of the rod with respect to the workpiece surface. The latter arrangement of the welding rod B is especially suitable for carrying out the novel underwater arc welding process automatically. When the novel underwater arc welding process is manually carried out, a worker, who works in the water to manually weld the workpiece W, detaches the holder H in which the welding rod B is supported from the support mechanism S and performs the manual welding process. However, in such as case it is frequently seen that such a worker is subjected to the force of the moving current of water and accordingly, the position of the worker relative to the welding zone in the water will be rendered unstable and as a result, the welding operation itself will be rendered unstable resulting in a poor welding result. Therefore, it is necessary to stabilize the position of the underwater worker in the water. Whether the novel underwater arc welding process is carried out manually or automatically, it is necessary that a least one worker other than the underwater worker is stationed on shore or a craft where the welder WR and compressed air supply source C arc disposed and the worker on shore or the craft maneuvers the welder and compressed air supply source while the worker in the water either carries out the welding process himself in the case of the manual operation or monitors the welding zone being worked in the case of the automatic welding operation.

The above-mentioned support mechanism S for the composite welding rod holder H is more clearly shown in FIGS. 3 through 7 of the accompanying drawings. As shown in these FIGS., the support mechanism S comprises a pedestal or base portion 1 which has a flat bottom surface 2 which contacts or rides on the upper surface of a workpiece W to be welded so that the support mechanism S can be stabilized on the workpiece. The pedestal 1 is provided at one end with a pair of arms 3 and 3' diverging upwardly and outwardly with angle of 90° therebetween and at the other end with a similar pair of arms 4 and 4'. The inner bottom of the pedestal 1 has a plurality of annular members or bearings 5 secured thereto at spaced points along the pedestal by means of welding, for example, and a rotary shaft 6 extending along the pedestal 1 is rotatably or pivotally supported by the annular members 5.

A first rocking plate 7 is rotatably or pivotally supported on the shaft 6 with the lower annular portion of the rocking plate loosely receiving the shaft and the rear or outer end surface of the rocking plate 7 has a trapezoidal stop plate 8 secured thereto by welding, for example as shown in FIG. 5. As seen in FIG. 5, the stop plate 8 extends transversely of the rocking plate 7 with the opposite ends projecting beyond the opposite sides of the rocking plate 7 and terminating short of the inner surfaces of the opposite arms 4 and 4', and accordingly, the rocking or pivotal movement of the rocking plate 7 may be stopped as one or the other end of the stop plate 8 abuts against the inner surface of either the arm 4 or 4' as seen in FIG. 6.

A second rocking or pivotal plate 9 is mounted on the front or outer surface of the first rocking plate 7 at 10 as seen in FIG. 3 for pivotal movement about the pivot pin 10 with respect to the first rocking plate 7. A cylindrical holding means 11 having a lower bracket with a depending internally threaded cylindrical member, in which a composite welding rod holder H is telescopically received, is secured to the upper edge by means of a suitable securing means. The second rocking plate 9 further has a cylindrical member 12 secured thereto along the upper edge at a position separated from right below the cylindrical holding means 11 and slidably receives a sliding bar 13 which is normally pulled into the cylindrical member 12 by means of a compressed spring disposed within the cylindrical member (not shown). The exposed or projected end of the sliding bar 13 has a depending cam plate 15 secured thereto and the cam plate is adapted to move forwardly and backwardly (in the right and left hand directions as seen in FIG. 3) within and along a slit (not shown) formed in a guide plate 14 which is in turn secured to the bottom of the cylindrical member 12 by means of a suitable securing means. The cam plate 15 is adapted to be contacted at the lower edge by a cam roller 16 which is in turn rotatably supported by an arm 18 which is in turn journaled on a transverse stub shaft 17. A coiled spring (not shown) is wound on the stub shaft 17 and one or free end of spring normally urges the roller 16 in the arrow direction as seen in FIG. 3. A manual manually actuated handle 19 is rotatably supported on the stub shaft 17 at a point adjacent to the end remote from the end to which the arm 18 is journaled and when manipulated, the handle is rotated in the direction opposite to the arrow direction as seen in FIG. 3. When the handle 19 is rotated in the aforementioned opposite arrow direction, or clockwise as seen in FIG. 3, said handle is being rotated against the force of the spring mounted on shaft 17. Roller 16 is also moved in the same direction, since it is attached to said handle 19. As roller 16 is moving, it engages the cam plate 15, and said cam plate 15 and, accordingly, the siding bar 13 also move in the same, or clockwise, direction the roller 16 being in sliding contact with the lower edge of the cam plate 15 against the force of the spring disposed within the cylindrical member 12. As the roller 16 and cam plate 15 move in the above-mentioned manner, the roller 16 rotates from the inner end edge to the right end edge of the cam plate 15 whereupon the cam plate 15 suddenly moves to the left-hand direction by the pulling action of the spring within the cylindrical member 12 and the roller also suddenly assumes the position shown with the dotted line in in FIG. 3. Thereafter, when the handle 19 is released after the cam plate 15 has moved to its predetermined extreme left-hand position and the roller 16 has reached the dotted line position of FIG. 3 as mentioned above, the tendency of the roller 16 to rotate in the arrow direction by the force of the coiled spring on the stub shaft 17 pushes the cam plate 15 so as to cause the cam plate to pivot the second rocking plate 9 about the pivot pin 10 in the arrow direction as seen in FIG. 3. The pivotal movement of the second rocking plate 9 acts to bring the composite welding rod B held in the holder H toward the workpiece W and more particularly, such movement of the second rocking plate 9 acts to bring the tip end of the welding rod B into contact with the welding zone on the workpiece W. As the welding rod of the composite welding rod is gradually consumed increasing its angle with respect to the upper surface of the workpiece W, the roller 16 rotates along the lower edge from right to left as seen in FIG. 3 until the roller comes out of its rolling contact with the lower edge of the cam plate 15, the angle of the welding rod B exceeds its predetermined maximum degree and with respect to the workpiece surface the roller 16 springs into a position in front of the inner edge of the cam plate 15 so as to suddenly pushes the second rocking plate 9 at its rear end surface 9a whereby the second rocking plate pivots in the direction opposite to the arrow direction as shown in FIG. 3 so as to move the composite welding rod B away from the workpiece W whereupon the welding operation is discontinued. As the composite welding rod B is moved away from the workpiece W in the manner mentioned above, an arc which is now being established on the welding zone extinguishes and the second rocking plate 9 abuts against a laterally projecting engaging ear or stop 20 on the front or outer surface of the first rocking plate 7 as seen in FIG. 3 whereby the second rocking plate 9 can be prevented from further pivotal movement from the position shown in FIG. 3 in the right-hand direction.

A set of permanent magnets 21 and 21' are attracted to the upper surface of the workpiece W at points outwardly of and adjacent to the arms 3 and 4' of the pedestal 1, respectively. The top surfaces of these permanent magnets 21 and 21' has mounting plates 23 and 23' secured thereto, respectively, by means of set screws 24 and 24' with nonmagnetic plates 22 and 22' interposed between the magnets and mounting plates. As shown in FIG. 4, one of the mounting plates or the mount plate 23 has a rightwardly and downwardly bent portion 23a which contacts along and is secured to the inner surface of the arm 3 of the pedestal 1 by means of a plurality of set screws 25 whereby the pedestal 1 may be stably held on the horizontal surfaces of the workpiece W with the flat bottom 2 thereof in flush contact with the workpiece W. The other mounting plate 23' also has a leftwardly and downwardly bent portion 23'a which contacts along the inner surface of the arm 4' of the pedestal 1 so to stably hold the pedestal on the workpiece. The leftwardly and downwardly bent portion 23'a of the mounting plate 23' has a small piece 26 secured to one side edge thereof and the small piece is adapted to be detachably secured to the stop 8 of the first mounting plate 7 by means of a bolt 27 whereby the first rocking plate 7 can be positively held in its desired vertical position.

A single permanent magnet 28 having nonmagnetic plates 29 and 29' secured to the opposite sides thereof is provided and one of the nonmagnetic plates or the nonmagnetic plate 29 has a L-shaped mounting plate 30 secured thereto by means of welding or any other suitable means. The above-mentioned permanent magnet 28 further has an arm 32 detachably secured to the mounting plate 30 by means of a plurality of set screws 31. The arm 32 has a lower annular portion which is rotatably supported on the shaft 6 whereby the arm 32 may pivot in the opposite directions transversely of the axis of the shaft 6, but the pivotal movement of the arm 32 is limited by a stop 33 projecting on one side of the arm at a point above the lower annular portion which is adapted to engage either the arm 3 or 3' depending upon the direction of the pivotal movement of the arm 32. When the stop 33 engages the arm 3 and maintains the position, the outer surface of one side 28a of the permanent magnet 28 and that of the arm 3 lie in the same plane while when the stop 33 contacts the arm 3' and maintains the position, the outer surface of the other side 28b of the permanent magnet arm 28 and that of the arm 3' lie in the same plane.

When a horizontal welding operation is to be performed with in accordance with the present invention as illustrated in FIG. 1, the support mechanism S is disposed on the workpiece W with the flat bottom surface 2 positioned in flush contact with the upper surface of the W and the diverging ends of the arms 3, 3' and 4, 4' upwardly directing whereby the pedestal 1 of the support mechanism S is horizontally held on the workpiece W and the permanent magnet 21' maintains the first and second rocking plates 7 and 9 vertically. In such a case, it is mandatory that the holder H and accordingly, the composite welding rod B supported therein must be positioned along the welding line on the workpiece W.

When a horizontal fillet welding operation is carried out in accordance with the present invention, the bolts 25 and 27 are threadably removed out of stop 8 of the first rocking arm 7, associated small piece 26 of the mounting plate 23' and the mounting plate 23 so that the set of permanent magnets 21 and 21' may be freed from the arms 3 and 4'. Thereafter, the pedestal 1 of the support mechanism S is reoriented so that the outer side of the arm 3 and that of the arm 4 may contact the upper surface of the workpiece W' to be fillet welded, respectively, as shown in FIGS. 6 and 7, and accordingly, regardless of whether the single permanent magnet 28 which is secured to the arm 3' is manually manipulated so as to dispose the magnet vertically as shown with the solid line or dispose the same horizontally as shown with the dotted line in FIG. 7, the support mechanism S can be positively and stably held on the workpiece W' by the magnetic force of the permanent magnet 28. With the above disposition of the support mechanism S, the stop 8 is rendered into its free or nonoperative position and allowed to contact at one end against the inner surface of the arm 4 which is now horizontally disposed so as to maintain the first rocking plate 7 at a predetermined angle with respect to the workpiece W' whereby the composite welding rod B supported in the holder H may be disposed in a proper operative position for fillet welding the workpiece W'.

The above-mentioned composite welding rod B is more clearly shown in FIG. 8, and as shown in this figure the composite rod comprises a conventional coated welding rod 43 including a conductor 41 having a coating 42 applied thereon except for the tip end portion; a spacer 44 in the form of the thin aluminum wire or strip spirally wound around the coated rod 43; and an outer sheath 45 in the form of a water or sea water resisting insulative tape wound around the rod extending along the substantial length of the rod. The aluminum wire or strip spacer 44 is so wound around the coated rod 43 that each of the flights in the spiral may have an inner diameter larger than that of the coated rod 43 so as to prevent the spiral flights of the spacer 44 from directly contacting the rod 43. The outer sheath 45 may be formed of a synthetic resin tape which gradually fuses due to the heat from an arc to be established in the welding zone, but does not burn up by such heat, and such materials include vinyl tape and a cellotape. A plug 46 having a reduced diameter extension 46a and formed of a strip of thin aluminum is partially fit in the outer annular sheath 45 at one end of the latter (the right end as seen in FIG. 8) with the reduced diameter extension 46a sealingly disposed on the exposed or uncoated end portion of the conductor 41 and pushing the adjacent one flight in the spiral of the spacer 44 inwardly. The end surface of the plug 46 is provided with a plurality of apertures 47 through which the compressed air from the compressed air supply source via the holder H may be introduced into an annular air passage defined between the outer sheath 45 and coated rod 43. A second plug 48 formed of a thin strip of aluminum is fit into the outer sheath 45 at the other end or left-hand end of the outer sheath 45 and has a reduced diameter annular extension 48a which is secured to the conductor 41 and also pushes the adjacent one flight of the spacer 44 inwardly. Similarly, the end surface of the second plug 48 is also provided with a plurality of apertures 49 through which the compressed air, which has been introduced into and passed through the annular passage between the outer sheath 45 and coated rod 43, may be discharged into the water surrounding the composite welding rod B as bubbles so as to form an air pocket around the operative tip of the coated rod 43. Therefore, when the composite welding rod B is brought to a point adjacent to the weld line on the workpiece W, the welding zone is disposed within the air pocket and arc may be established and maintained there.

Figure 9:
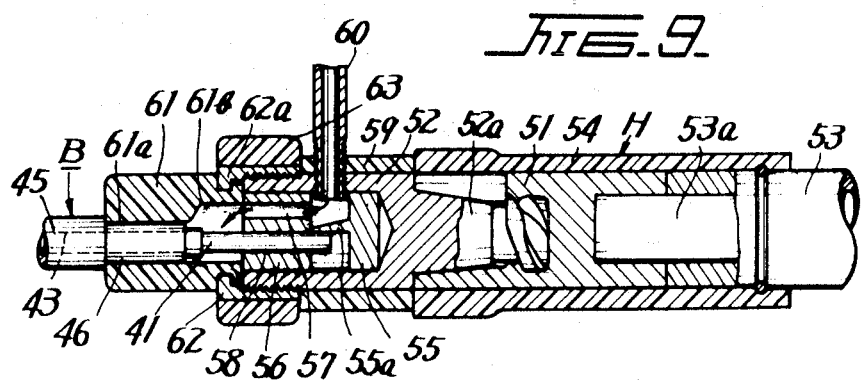
FIG. 9 is a longitudinally sectional view of a holder for said composite welding rod shown in FIG. 8 which is especially useful when the welding process is automatically carried out.

The above-mentioned composite welding rod holder H is more clearly shown in FIG. 9, and as shown in this figure the holder comprises a conductor having a cylindrical conductive base member 51 and a cylindrical conductive head member 52. The conductive base member 51 is provided at one end surface or the inner end surface of the member with a threaded recess and the head member 52 is provided at the end adjacent to the recessed end surface of the base member 51 with a tapered projection 52a having a mating threaded end for threaded engagement with the threaded recess in the base conductive member 51 s o that the base and head conductive members can be detachably connected to each other. The conductive base member 51 is also provided at the other end surface with a recess for receiving the adjacent end of a length of welding cable 53 which is payed out from the welder WR and the cable end is positively retained in the recess by means of soldering, for example. A rubber or the like elastic and insulative cylindrical sheath 54 extends over the entire length and in contact with the periphery of the conductive base member 51 and a portion of the periphery of the adjacent end portion of the welding cable 53 and seals the interior of the conductive base member 51 against the rushing of the surrounding water into the base member. The recess in the conductive head member 52 detachably receives a small conductive piece 55 having a pointed electrode plate 55a projecting laterally of the adjacent end surface of the conductive piece 55. Also disposed within the recess of the conductive head member is a conductive annular retaining member 56 having a rear end surface abutting against the pointed electrode plate 55a. The retaining member 56 has a gas opening 57 and a welding rod receiving opening 58 laterally spaced from the gas opening and these gas and welding rod receiving openings extend through the entire thickness of the annular retaining member 56. An insulative hollow cylindrical member 59 formed of phenol resin is disposed on and secured to the plain or inner portion of the head member 52. The compressed air guiding pipe P which extends from the compressed air supply source C has one end of coupling pipe 60 connected thereto in any conventional manner and the coupling has a thread in the outer periphery of the lower end portion thereof extending through the mating threaded bores in the walls of the insulative cylindrical member 59 and conductive head member 52 into the recess of the head member 52 whereby the interior of the pipe P may be communication with the recess of the head member 52. Thus, the compressed air from the compressed air supply source C passes through the pipe R and coupling 60 into the head member 55 from where the compressed air is sent through the gas opening 57 of the head member 52 toward the outwardly facing end of the head member. An elastic insulative cylindrical retaining member 61 is provided at the outwardly facing and of the head member 52 and has an annular recess in the periphery adjacent to the inner end for receiving an inwardly projecting annular flange 62a of a cylindrical metallic member 62 which also has a thread formed in the inner periphery of the cylindrical member for threaded engagement with the threaded outer portion of the head member 52 whereby the cylindrical member 52 may be detachably connected to the insulative retaining member 61. An insulative annular member 63 formed of phenol resin is fit on and secured to the metallic cylindrical member 62 and by gripping in insulative cylindrical member the retaining member 61 may be easily connected to or disconnected from the head member 52. The retaining member 61 has an axial opening 61a extending along a substantial portion of the length of the retaining member and having a diameter sufficient to yieldingly receive the plug 16 on the composite welding rod B and another or enlarged opening 61b extending along the remaining portion of the retaining member and communicating at the outer end with the opening 61a and at the inner end with the gas opening 58 in the head member 52.

The above-mentioned composite welding rod holder H is connected to the welding rod B in the manner to be described below. That is, annular member 63 is gripped and cylindrical member 62, which is unitarily combined with the annular member 63, is threaded out of the threaded portion of the head member 52 so as to also disconnect the retaining member 61 from the head member 52 and then the plug 46 on the composite rod B is forcibly inserted into the smaller diameter opening 61a and larger diameter opening 61b in the insulative retaining member 61 until the uncoated end portion of the conductor or electrode 41 extends beyond the openings 61a and 61b to a predetermined distance. Thereafter, the annular retaining member 63 and cylindrical member 62 is repositioned on the head member 52 so as to pass the extending end portion of the conductor 41 through the retaining opening 58 in the retaining member 56 until the conductor 41 abuts against the underside of the pointed electrode plate 56 and the retaining member 61 may be again connected to the head member 52 whereby the connection of the holder H to the composite welding rod B is completed.

In operation, the valving mechanism of the compressed air supply source C (not shown) is opened for communication with the pipe P, holder H and composite welding rod B to supply the compressed air to the composite welding rod and then a worker wearing a diving suit dives into the water to bring the welding rod B held in the holder H to a predetermined proper position relative to the workpiece W laid in the water. If the welding operation is manually carried out, the worker which brought the welding rod B to the above-mentioned predetermined position continues to hold the rod and manipulates to position the same in varying angled predetermined welding relations to the workpiece W. On the other hand, when the welding operation is automatically carried out, the holder H in which the composite welding rod B is held is inserted into the retaining member 11 of the support mechanism S and secured to the same. Once the holder H and accordingly, the composite welding rod B is secured to the support mechanism S and set at a predetermined disposition or angle with respect to the workpiece W as the welding operation progresses or the conductor is consumed the welding rod B or the tip end of the conductor 41 is at all times caused to change its disposition so as to assume a proper relation with respect to the weld line on the workpiece W although the angle of the tip end of the conductor 41 with respect to the workpiece W may vary. In the manual operation, after the holder H in which the composite welding rod B is held has been properly positioned relative to the workpiece W, the underwater worker gives a signal to the worker on shore or the craft to initiate supply of welding current from the welder. In case of the manual underwater welding operation, as commonly practiced in the art for welding operations on land, the tip end of the conductor 41 is initially caused to contact the surface of the workpiece W and then current is allowed to flow from the welder through the conductor to the workpiece W. Thereafter, the tip end of the conductor is slightly moved away from the workpiece W so as to cause arc to initiate. Since the tip end of the conductor is at all times urged against the workpiece W, short circuit current flows across the contact point between the workpiece and conductor tip whereby arc is established. When the arc is established in the welding zone, the coated welding rod 43 melts due to the heat from the arc and at the same time the plug 48 adjacent to the tip end of the rod also melts whereby the flow amount of the compressed air discharging through the tip end of the rod 43 increases and the thus discharged compressed air surrounds the welding zone. Thus, the welding operation is carried out in the above-mentioned air environment. As the coated rod 43 melts, the spiral spacer 44 and outer sheath 45 also melt accordingly, and therefore, the compressed air supply point for the workpiece W moves along the weld line on the workpiece as the welding operation progresses. When the welding rod has almost diminished away or been almost entirely consumed the underwater worker signals the worker on shore or the craft to discontinue the supply of the welding current, the consumed welding rod is then replaced by a new one, and the operation is ready for resumption. During the above-mentioned replacement of the welding rod, the compressed air is continuously discharging through the holder H and, accordingly, the surrounding water can be effectively prevented from rushing into the holder. In the underwater molding operation, the arc and its surrounding area are surrounded by a great number of bubbles and, accordingly, the condition of the arc and crater developed in the arc can not be observed from outside and, therefore, in order to maintain the effective length of the arc to a predetermined constant value, the automatic welding is preferable to the manular welding operation in carrying out the present invention.

As in the case of the so-called welding operation on land, the underwater welding operation causes the spattering to take place, but the degree of the spattering in the underwater welding operation is greater then that of the land welding operation. The particles of the spatterings generated in the underwater welding operation vary from these having fine-surfaced small spherical shapes which can not be observed by the naked eye to large ones having diameters 1 mm. on the order and these splattered particles generally adhere to areas covering 15–20 mm. distance on the opposite sides of the weld bead as the center.

The present invention is most suitable for welding workpieces W having relatively great thicknesses and for example, the workpieces having thicknesses in excess of 10 mm. can be quite satisfactorily welded. For manual-welding, the composite welding rod B preferably has the length on the order of 400 mm. And as to the diameter of the welding rod, the same is preferably on the order of 4 mm. because if the diameter of the welding rod is 5 mm. such a greater diameter of welding rod may cause a rather greater crater. The welding power supply source is preferably a DC welder rather than a AC welder because of the specific polarity. The reverse polarity arrangement in which the welding rod is positive and the workpiece W is negative is preferable because such a reverse polarity arrangement accelerates the striking out of an arc. With the same diameter for the welding rod, the underwater welding operation is preferably carried out at a voltage higher by several volts than that for land welding so that the welding current may be about 20 percent higher than that of land welding. If a coated welding rod having the diameter on the order of 4 mm., welding current is preferably on the order of 250–300 A. with nonload voltage of 60 v. and current leakage of 15–20 A. at a depth of 10 m. below the water surface. Since any water welding operation must be carried out within a short period of time, metal deposits rate per unit of time should be as great as possible.

Figure 10:
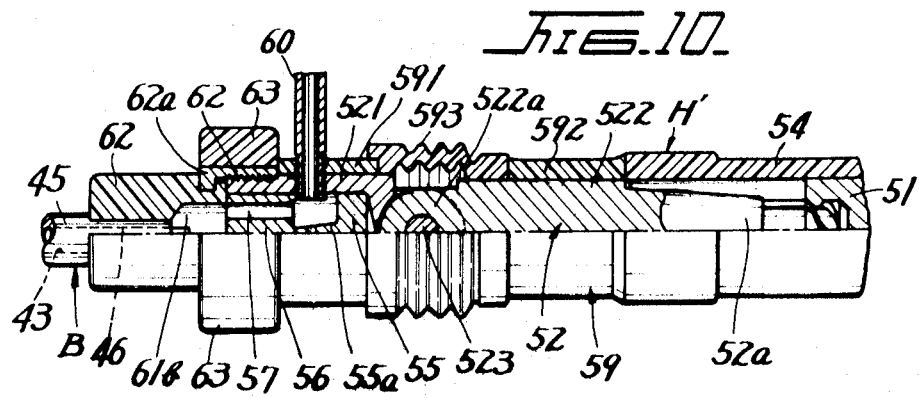
FIG. 10 is a longitudinally sectional view of a modified form of holder for said composite welding rod which is especially useful when the welding process is manually carried out.
Figure 11:
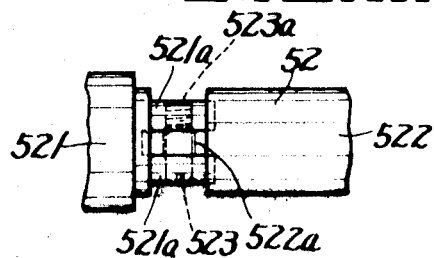
FIG. 11 is a fragmentary top plan view especially showing the pivotal portion of the composite welding rod holder shown in FIG. 10.

A most preferable form of welding rod holder for manual underwater welding is illustrated in FIGS. 10 and 11 of the accompanying drawings. As shown in these figures the holder is generally indicated by the reference character H' and comprises a conductive head 52 including an one-end closed cylindrical conductor member 521 and a bar-shaped conductor 522. The outer closed or inner end surface of the conductor 521 is provided with a pair of lateral ears 521a as shown in FIG. 11. The adjacent end surface of the conductor 522 is also provided with a single mating ear 522a adapted to be fit in the space between the opposing ears 521a on the conductor 521. One of the pair of ears 521a or the upper ear as shown in FIG. 11 is provided with a threaded bore and the other or lower ear is also provided a transverse bore aligned with the threaded bore but not threaded. The ear 522a is also provided with a nonthreaded transverse bore in alignment with the bores in the ears 521a of the conductor 521. A pivotal connecting member 523 having thread at the tip end is inserted through the aligned bores in the conductors 521 and 522 with the threaded tip end threaded into the threaded bore in the one ear 521a. With the above arrangement of the ears of the conductors and pivot pin, the pivot pin connects between both the conductor in such a manner that when the conductors 521 and 522 are forcibly pivoted by hand about the axis of the pivot pin 523 they pivot relative to each other, but when the force applied on both the conductors are removed therefrom they maintain the position which they assume at the time of release of such force. In the holder illustrated in FIGS. 10 and 11, an insulating cylindrical member 59 is divided into two portions 591 and 592 with the portion 591 encircling the conductor 521 while the portion 592 encircling the conductor 522. The junction between the conductors 521 and 522 is surrounded by a creased insulating ring 593 formed of flexible and elastic insulative material such as silicone rubber and the opposite ends of the ring are rigidly secured to the portions 591 and 592. Accordingly, when an underwater welding operation is carried out with the use of the holder illustrated in FIG. 11, the welding operation can be performed in any desired position by bending the portions adjacent to the conductor 521 of the conductive head 52 together with the insulating ring 593.

Although certain preferred embodiments of the present invention have been described and illustrated herein, it is to be understood that these are illustrative in nature and not to be necessarily limiting upon the scope of these teachings in their broader aspects. Many additional variations within the scope of the appended claims will occur to those skilled in the art.

What is claimed is:

1. An underwater arc welding apparatus comprising:
   a source of electric welding current;
   a source of compressed gas;
   a support mechanism;
   a welding rod holder having an inner space and carried by the support mechanism;
   a gas conduit connecting said source of compressed gas to said inner space of said holder;
   an electric conductor disposed in said inner space of said holder;
   an electric cable, connecting said source of electric welding current with said conductor;
   a welding rod comprising a welding rod portion and an outer sheath portion surrounding said rod portion in a spaced relation;
   a gas passage existing between the said rod portion and said sheath portion;
   said welding rod having a tip end and base end, being mounted with said base end in said holder being openly connected with said source of compressed gas and in electrical contact with said conductor, in which said conductor comprises two hinging portions and a pivot pin, said two hinging portions being pivotally supported on said pivot pin in such a rigid connection arrangement that said hinging portions may be manually pivoted about said pivot pin relative to each other, but when they are released, said hinging portions may maintain a predetermined relative relation;
   said pivot pin of the said hinging portions being enclosed by a bellows-shape insulative annular member.

2. An underwater arc welding apparatus as set forth in claim 1 in which said welding rod further comprises an aluminum wire spacer, wound on said welding rod portion having a base end, in a spiral form between said welding rod portion and said outer sheath; and an aluminum plug tightly secured to said base end of said welding rod portion for holding said outer sheath in an airtight relation to said base end, said plug being provided at one end surface thereof with a plurality of apertures through which said inner space of said welding rod holder and said annular space in said welding rod may be openly connected with each other.

3. An apparatus as set forth in claim 1, in which said welding rod further includes an aluminum wire spacer wound around said welding rod in a spiral form between said welding rod portion and said outer sheath portion and an aluminum plug attached to the base end of said welding rod portion for communicating with said outer sheath portion in an airtight relation, said aluminum plug being provided at one end surface with a plurality of apertures through which said inner space of said holder is communicated with said gas passage of said welding rod.

4. An apparatus as set forth in claim 1, in which said support mechanism comprises a pedestal, a rocking plate pivotally supported by said pedestal for forwardly and backwardly pivotal movement, and a retaining member attached to said rocking plate and detachably mounting said electrode holder, said rocking plate having a cam plate at the rear portion thereof and a roller pivoted on said pedestal and mounted to rock forwardly for contact with said cam plate so as to cause said composite welding rod to contact a workpiece.

5. An apparatus as set forth in claim 4, further comprising a cylindrical member and a compression spring, in which a portion of said cam plate is slidably retained in said cylindrical member secured to said rocking plate and normally subject to a force to a position just behind said rocking plate by the pressure action of said spring whereby when said roller is pulled backwardly said cam plate is pulled away from the position behind said rocking plate against the force of said spring in contact with said roller and said roller is guided to a position behind the cam plate.

6. An apparatus as set forth in claim 5, in which said support mechanism further includes a plurality pairs of arms at the opposite ends of said pedestal with said arms of each pair diverging toward one end at 90°, and at least one of the arms has a first permanent magnet detachably secured thereto whereby the bottom of said pedestal rides on a workpiece with a stability by the permanent magnet being attracted toward the workpiece and when a fillet welding is performed, the arms in each pair of said plurality pairs of arms are so arranged that they are adapted to contact the vertical portion and horizontal portion of said workpiece, and said support mechanism further includes a second permanent magnet pivotally supported on the upper surface of said pedestal by means of a stub shaft for lateral movement, said second permanent magnet being adapted to be attracted to said workpiece when a fillet welding is performed whereby the pedestal is stably held on a workpiece.

* * * * *